(12) United States Patent
Moroney

(10) Patent No.: US 8,762,419 B2
(45) Date of Patent: Jun. 24, 2014

(54) LEXICAL CLASSIFICATION SYSTEM WITH DYNAMIC MODIFIERS

(75) Inventor: Nathan M. Moroney, Palo Alto, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 2567 days.

(21) Appl. No.: 11/264,575

(22) Filed: Oct. 31, 2005

(65) Prior Publication Data

US 2007/0100786 A1 May 3, 2007

(51) Int. Cl.
*G06F 17/30* (2006.01)
(52) U.S. Cl.
USPC .......................................................... 707/803
(58) Field of Classification Search
USPC .................................. 707/770, 803, 758, 802
See application file for complete search history.

(56) References Cited

U.S. PATENT DOCUMENTS

| | | | | |
|---|---|---|---|---|
| 5,793,195 A | * | 8/1998 | Kaufman et al. | 324/71.3 |
| 6,101,515 A | * | 8/2000 | Wical et al. | 715/234 |
| 2002/0106121 A1 | * | 8/2002 | McClanahan | 382/156 |
| 2005/0102349 A1 | * | 5/2005 | Rice et al. | 709/201 |
| 2005/0226331 A1 | * | 10/2005 | Mohamed et al. | 375/240.16 |
| 2006/0087517 A1 | * | 4/2006 | Mojsilovic | 345/593 |
| 2007/0100786 A1 | * | 5/2007 | Moroney | 707/1 |

* cited by examiner

*Primary Examiner* — Ajay Bhatia
*Assistant Examiner* — Fatima Mina

(57) ABSTRACT

A method of applying a color modifier to a color having a corresponding color name. The method involves receiving a color modifier and a color name and determining a displacement value corresponding to the received color modifier. Determining a displacement value corresponding to the received color modifier involves reference to a color naming database including a set of color modifiers having corresponding color-attribute displacement values. The color modifier is applied to the color name by applying the displacement value to a color value corresponding to the color name.

16 Claims, 3 Drawing Sheets

LEXICAL CLASSIFICATION SYSTEM WITH DYNAMIC MODIFIERS

FIELD OF THE PRESENT INVENTION

The present invention relates generally to the naming of colors, and more particularly to a method and system for incorporating a color modifier in the naming of colors.

BACKGROUND OF THE PRESENT INVENTION

Color is a visual attribute resulting from a psychological and physiological response to light waves of a specific frequency impinging upon the eye. The perception of color results from the combined output of three sets of retinal cones having peak sensitivities in the red, green and blue portions of the electromagnetic spectrum. Different levels of stimulus to each set of retinal cones gives rise to the ability to perceive a large range of colors.

Conventional approaches to naming and describing colors have included systems based on color encodings which represent components of a color in terms of a position or coordinates in a usually three dimensional color space. An abridged list of such color encodings includes RGB, SWOP, CYMK, XYZ and CIELAB.

There is a considerable body of research devoted to color naming. Much of this research is based on the findings of Berlin and Kay (1991), who found universal patterns in color naming, and identified the eleven basic color names of red, green, yellow, blue, brown, pink, orange, purple, white, gray and black.

Unconstrained color naming often makes use of modifiers, or secondary terms, to better specify a color. Some modifiers are color specific, and other modifiers are general color modifiers which are applicable to multiple hues. General color modifiers include, for example "light" and "dark". Other color modifiers include, for example "lime" and "royal".

Hierarchical color naming systems have been proposed which apply a modifier to a color name. However, these are often based on assumptions about the use of the modifiers. For example, a given modifier may be assumed to have a clear delineation of boundaries which define the scope of the modifier in a given hue plane.

In the ISCC-NBS system, a hierarchy of modifiers is used to describe a given color. This system uses a fixed sequence of lightness and chroma modifiers for a given hue angle to partition a range of color. Using the ISCC-NBS color naming hierarchy, one color name modifier is mapped to a specific region in the color space. Two modifiers may be included in some regions of the space.

However, the model is limited in its flexibility and does not accommodate a comprehensive range of modifiers. Revisions have been proposed but these have focused primarily on the selection of modifiers, or the boundaries defining the modifier region in the color space.

It would be desirable to provide a system for incorporating color naming modifiers which is flexible, and reflects actual patterns of natural language usage.

SUMMARY OF THE PRESENT INVENTION

Briefly, the present invention provides a method of applying a color modifier to a color having a corresponding color name. The method involves receiving a color modifier and a color name and determining a displacement value corresponding to the received color modifier. Determining a displacement value corresponding to the received color modifier involves reference to a color naming database including a set of color modifiers having corresponding color-attribute displacement values. The color modifier is applied to the color name by applying the displacement value to a color value corresponding to the color name.

DETAILED DESCRIPTION OF EMBODIMENTS OF THE PRESENT INVENTION

Figure 1:
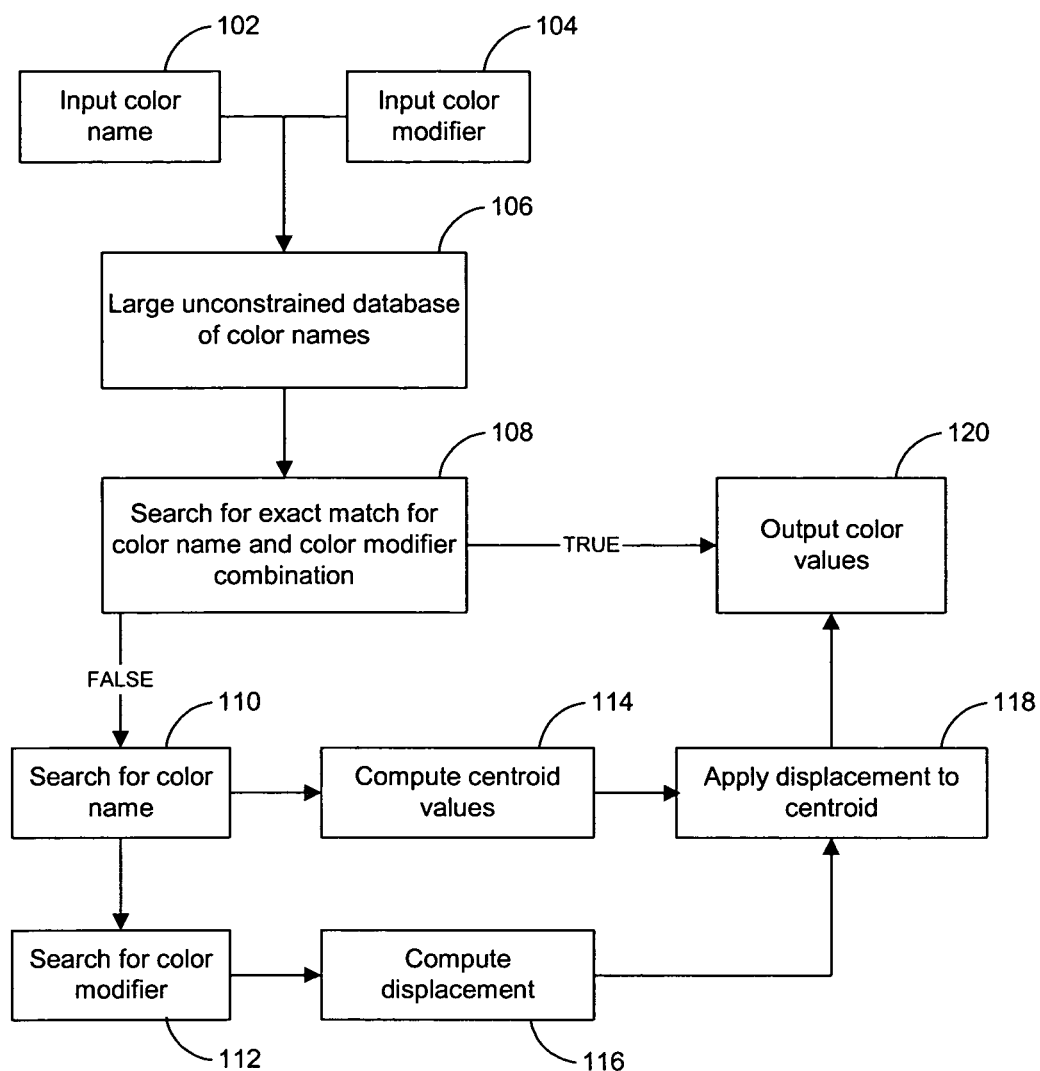
FIG. 1 is a flow chart showing steps in a method of applying a color modifier to a color having a color name, according to an embodiment of the invention.

An embodiment of the invention in which a color modifier is applied to a color having a color name is illustrated in FIG. 1. In a step 102, a color name is received. In a step 104 a color modifier is received. In a next step 106, a large unconstrained database of color names is interrogated to locate the received color name and color modifier.

In a step 108, the database is searched for an exact match for the received color name and color modifier combination. If an exact match is located, the corresponding color value for the color name plus color modifier is output in step 120. Usually, if an exact match of the color name plus color modifier exists in the database, step 108 will locate a hue-specific modifier. An example of a hue-specific modifier is "royal" when used in the color term, "royal purple".

If there is no exact match located in step 108, in a step 110 the database is interrogated to locate a color value corresponding to the received color name. A centroid value corresponding to the received color name is then computed in step 114. In one embodiment, an adaptive lexical classification system is used to create the color naming database. In this embodiment, the centroid value is a mean device value for the received color name, computed based on actual patterns of natural language usage.

In a step 112 the database is interrogated to locate all terms which use the received color modifier, and corresponding color attribute displacement values are extracted. The color attribute affected by the received modifier may include hue, lightness, chroma, saturation or intensity, or a combination of these.

There is often a significant amount of overlap in the use of color name modifiers, particularly in natural language usage. Accordingly, step 112 may locate more than one color name which has been modified using the received color modifier. This is particularly true of "general modifiers" such as "light" or "dark" which are applicable to a number of hues. However, trends in the usage of these modifiers can be identified and modeled as a mean displacement from a color centroid or mean device value corresponding to a given color.

In a step 116, a mean displacement value is computed using the color attribute displacement values extracted in step 112. Once the mean displacement is computed (116), the mean displacement value is applied to the centroid value in a step 118. In a step 120, the color value corresponding to the received color modifier applied to the received color name is output. Output may be by delivery or presentation of a set of color values used to identify the modified color in a three-dimensional color space, by printing or display on a screen of the actual color, or by any other means.

This method is useful even if the specific combination of received color modifier and received color name is not included in the color naming database. For example, if the received color name is "fuchsia" and the received color modifier is "dull", a color value or mean device representation for "dull fuchsia" can be computed even though "dull fuchsia" is not a color name featured in the database.

This is achieved by computing the mean lightness and chroma displacements for all color terms in the database using the modifier "dull" (the mean displacements). The mean displacements are then applied to the mean device value for "fuchsia" enabling "fuchsia" to be re-mapped in the color space according to the mean displacements.

Advantageously, the embodiments allow for a single modifier to affect more than one attribute of a given color. For example, a single modifier applied to a given color may affect its lightness as well as saturation. The system also allows for application of redundant color modifiers such as "pale" and "pastel" based on a given user's color naming vocabulary.

The received modifier is preferably dynamic, having a corresponding displacement value which changes with actual patterns of natural language usage. That is, as the color naming patterns in the database change, the mean displacements computed also change, thus providing flexibility and realistic indications of actual usage of color modifiers.

Figure 2:
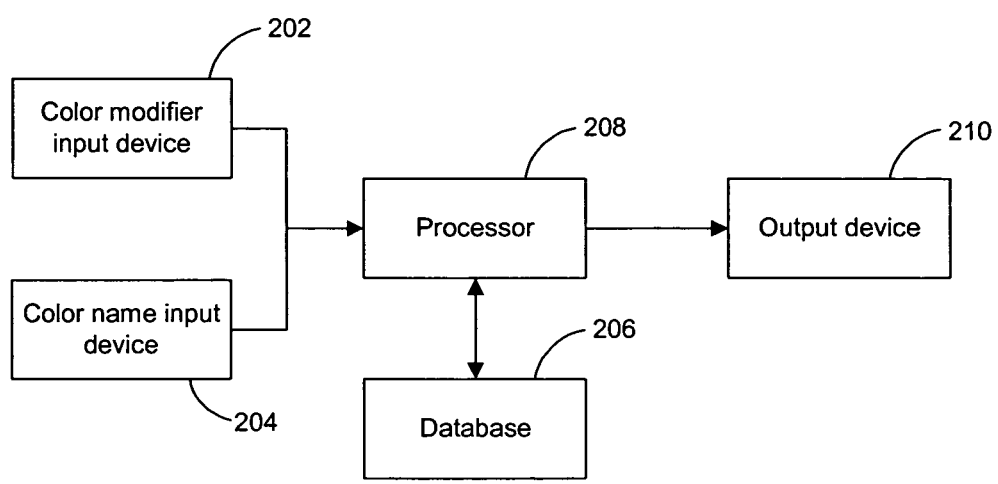
FIG. 2 is a schematic diagram showing components of a system according to an embodiment of the invention.

Another embodiment of the invention is illustrated in FIG. 2. A system for applying a color modifier to a color having a corresponding color name has an input device 202 for receiving a color modifier and input device 204 for receiving a color name. The system also has a database 206 providing a set of color names, color modifiers and corresponding color attribute values and displacement values.

A processor 208 is provided for determining a displacement value corresponding to a received color modifier by reference to the database 206. The processor also applies the displacement value to a color value corresponding to the color name. The system also includes an output device 210 for presenting a color value representative of the color modifier applied to the color name.

The input devices 202, 204 may be any suitable device, such as a keyboard, mouse, stylus or touch screen for receiving from a user a color name and a color modifier. It is to be understood that the color name input device and the color modifier input device could be combined into a single input device. Alternatively, received color name and color modifier may be selected from a list of color names and color modifiers presented to the user by the input device.

The database 206 contains lexical classifiers or color names corresponding to a particular color. Preferably, this set of lexical classifiers is developed by collecting color names from a large number of participants, and computing an average color value for the color name based on actual language usage. The larger the number of participants, the larger the number of color names collected, and the more robust the database will be.

In another of its aspects, the present embodiments provide computer-readable media having programmed thereon computer software for applying a color modifier to a color having a color name. The computer software performs steps including receiving a color modifier and a color name, and determining a displacement value corresponding to the received color modifier. Determining the displacement value involves reference to a color naming database including a set of color modifiers having corresponding color-attribute displacement values. The computer software also applies the displacement value to a color value corresponding to the color name.

Using the present embodiments, it is possible to compute a mean displacement which corresponds to a color modifier. Thus, given a color name and an adaptive lexical classification system, it is possible to compute a mean device representation of a color, and apply the mean displacement corresponding to the modifier to arrive at a color value that incorporates the effect of the modifier on the unmodified color. For a large database of diverse color names collected from a large number of participants, the computed mean displacement value reflects general usage patterns for the received modifier and is consistent with actual language usage.

The computed mean displacement can be used in color editing, or in other image processing such as lexical quantization. It can also be used color selection, having applicability in selecton of a color or color range, or when refining an estimate of the appearance of a given color.

The present embodiments enable use of a large database of unconstrained color names to infer a displacement from a given color centroid or mean device value. This enables the color naming and use of color modifiers to be based on actual patterns of natural language usage, rather than a fixed hierarchical naming system with clear delineation of boundaries defining modifier terms in a given hue plane.

Figure 3A:
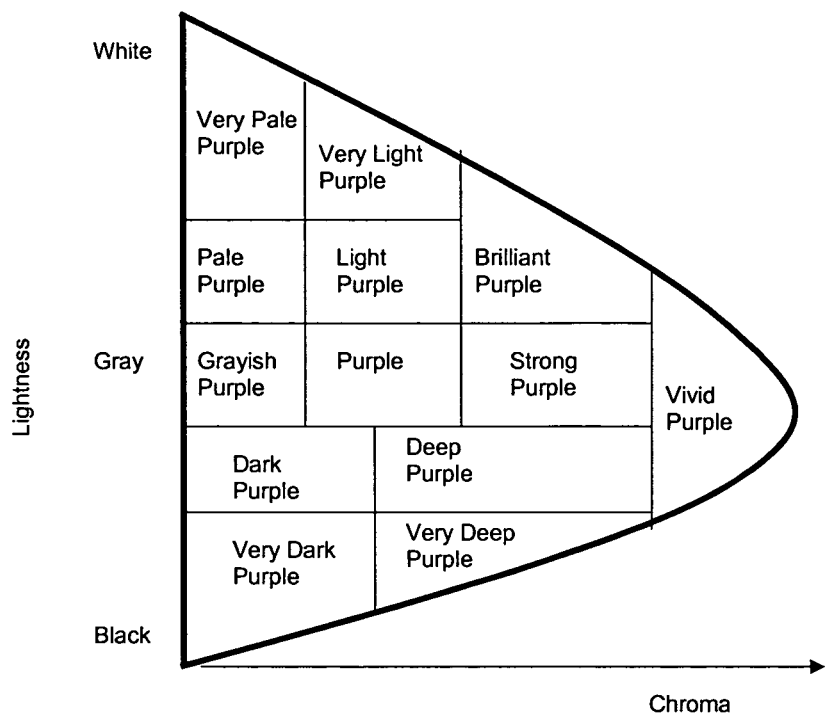
FIG. 3A is a graph illustrating use of the prior art ISCC-NBS method of designating colors.

FIG. 3A shows a representation of the ISCC-NBS method for designating colors, applied to the color purple. Here, it can be seen that the boundaries defining modifiers applicable to the color purple are fixed, with one modifier mapped to a given region in the color space, and with two modifiers used in some regions.

Figure 3B:
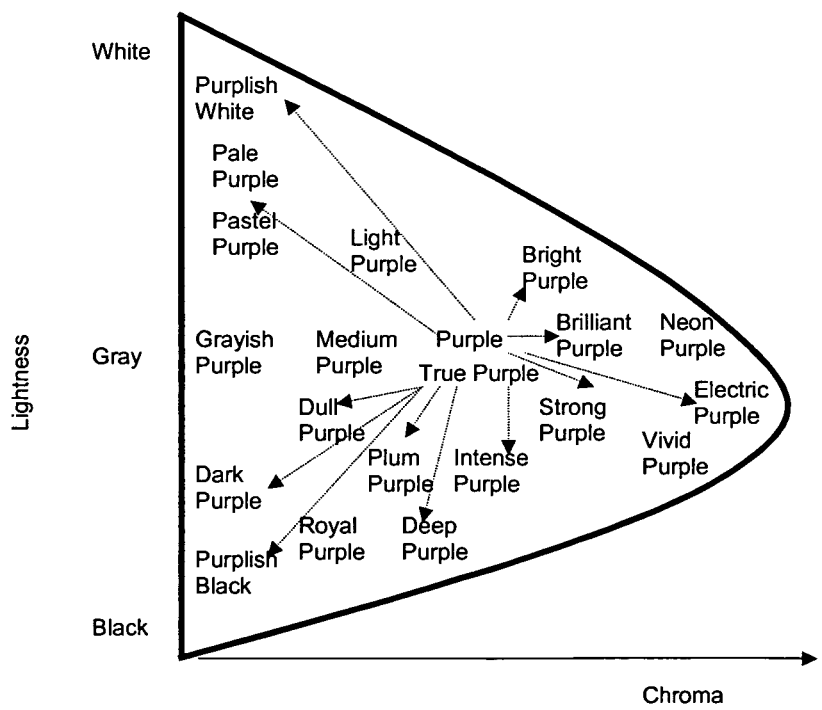
FIG. 3B is a graph illustrating use of a color modifier according to an embodiment of the invention.

FIG. 3B illustrates a system according to the present embodiments, also applying color modifiers to the color purple. Here, it can be seen that the boundaries between color modifiers are not fixed as in FIG. 3A, and the system allows for hue specific modifiers such as "royal" and general modifiers such as "intense" and "strong". The result is a more detailed mapping of a larger number of color modifiers applicable to a larger audience of users than systems and methods such as those in FIG. 3A which are based on regular regions as estimated by a small number of experts.

Using the present embodiments, it is possible to determine systematic relationships between color name modifiers and trends in the resulting color. Thus the system allows the development and use of a rich and dynamic vocabulary of modifiers. Advantageously, it accommodates hue-specific modifiers as well as modifiers with partial or complete overlap in a given hue plane.

Although the present invention has been described in terms of the presently preferred embodiments, it is to be understood that the disclosure is not to be interpreted as limiting. Various alterations and modifications will no doubt become apparent to those skilled in the art after having read the above disclosure. Accordingly, it is intended that the appended claims be interpreted as covering all alterations and modifications as fall within the true spirit and scope of the invention.

The invention claimed is:

1. A method of applying a color name modifier to a color having a color name, the method comprising the steps of:
   receiving a color name modifier;
   receiving a color name;
   determining a displacement value corresponding to the received color name modifier by reference to a color naming database including a set of color name modifiers having corresponding color-attribute displacement values, wherein the displacement value is a mean displacement value determined by interrogating the database and computing the mean displacement value for a plurality of names in the database having the received color name modifier as a part of each of the plurality of names; and applying the displacement value to a color value corresponding to the color name.

2. A method according to claim 1 wherein the displacement value is a mean displacement value determined by interrogating the database and computing the mean displacement value for all names in the database using the received color name modifier.

3. A method according to claim 1 wherein the color attribute displaced by the color name modifier includes one or more of hue, lightness, chroma, saturation and intensity.

4. A method according to claim 1 wherein the received color name modifier is dynamic, having a corresponding displacement value which changes with actual patterns of natural language usage.

5. A method according to claim 1 using an adaptive lexical classification system for naming colors in the database.

6. A system for applying a color name modifier to a color having a corresponding name, the system comprising:
   an input device receiving a color name modifier;
   an input device receiving a color name; a database providing a set of color names, color name modifiers and corresponding color attribute values and displacements;
   a processor that determines a displacement value corresponding to a received color name modifier by reference to the database, and applies the displacement value to a color value corresponding to the color name, wherein the displacement value is a mean displacement value determined by interrogating the database and computing the mean displacement value for a plurality of names in the database having the received color name modifier as a part of each of the plurality of names; and
   an output device presenting a representation of the color name modifier applied to the color.

7. A system according to claim 6 wherein the displacement value is a mean displacement determined by the processor interrogating the database and computing a mean displacement value for all names in the database using the received color name modifier.

8. A system according to claim 6 wherein the color attribute displaced by the color name modifier includes one or more of hue, lightness, chroma, saturation and intensity.

9. A system according to claim 6 wherein the received color modifier is dynamic, having a corresponding displacement value which changes with actual patterns of natural language usage.

10. A system according to claim 6 incorporating an adaptive lexical classification system for naming colors in the database.

11. A non-transitory computer-readable storage device having programmed thereon computer software for applying a color name modifier to a color having a color name, the computer software performing the following steps:
    receiving a color name modifier;
    receiving a color name;
    determining a displacement value corresponding to the received color name modifier by reference to a color naming database including a set of color name modifiers having corresponding color-attributes displacement values, wherein the displacement value is a mean displacement value determined by interrogating the database and computing the mean displacement value for a plurality of names in the database having the received color name modifier as a part of each of the plurality of names; and applying the displacement value to a color value corresponding to the color name.

12. A non-transitory computer-readable storage device according to claim 11 wherein the received color name modifier is dynamic having a corresponding displacement value which changes with actual patterns of natural language usage.

13. A non-transitory computer-readable storage device according to claim 11 wherein the color attribute displaced by the color name modifier includes one or more of hue, lightness, chroma, saturation and intensity.

14. A non-transitory computer-readable storage device according to claim 11 wherein the received color name modifier is dynamic having a corresponding displacement value which changes with actual patterns of natural language usage.

15. A non-transitory computer-readable storage device according to claim 11 wherein the computer software further performs the step of computing a mean device representation corresponding to the color name modified by the received color name modifier.

16. A non-transitory computer-readable storage device according to claim 11 wherein the computer software further utilizes an adaptive lexical classification system for naming colors in the database.

\* \* \* \* \*